(12) United States Patent
Ned et al.

(10) Patent No.: US 10,605,685 B2
(45) Date of Patent: *Mar. 31, 2020

(54) HIGH-TEMPERATURE HEADERS FOR SENSING ELEMENTS

(71) Applicant: Kulite Semiconductor Products, Inc., Leonia, NJ (US)

(72) Inventors: Alexander Ned, Kinnelon, NJ (US); Sorin Stefanescu, New Milford, NJ (US); Scott Goodman, Wayne, NJ (US)

(73) Assignee: Kulite Semiconductor Products, Inc., Leonia, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/150,485

(22) Filed: Oct. 3, 2018

(65) Prior Publication Data
US 2019/0033155 A1 Jan. 31, 2019

Related U.S. Application Data

(63) Continuation of application No. 15/211,610, filed on Jul. 15, 2016, now Pat. No. 10,119,877.

(60) Provisional application No. 62/193,480, filed on Jul. 16, 2015.

(51) Int. Cl.
*G01L 19/04* (2006.01)
*G01L 19/06* (2006.01)
*G01L 19/14* (2006.01)

(52) U.S. Cl.
CPC ........ *G01L 19/0681* (2013.01); *G01L 19/04* (2013.01)

(58) Field of Classification Search
CPC ...... G01L 19/00; G01L 19/0084; G01L 19/04; G01L 19/06; G01L 19/0681; G01L 19/14; G01L 19/142
See application file for complete search history.

(56) References Cited

U.S. PATENT DOCUMENTS

| | | | |
|---|---|---|---|
| 5,955,771 A | 9/1999 | Kurtz et al. | |
| 6,058,782 A | 5/2000 | Kurtz et al. | |
| 10,119,877 B2 * | 11/2018 | Ned | G01L 19/04 |
| 2006/0157840 A1 | 7/2006 | Kurtz et al. | |
| 2009/0108382 A1 | 4/2009 | Eriksen et al. | |
| 2012/0024073 A1 | 2/2012 | Guo | |

* cited by examiner

*Primary Examiner* — Nguyen Q. Ha
(74) *Attorney, Agent, or Firm* — Troutman Sanders LLP; James E. Schutz; Mark Lehi Jones

(57) ABSTRACT

Certain implementations of the disclosed technology include systems and methods for providing header assemblies for use with pressure sensors in high-temperature environments. Certain example implementations include a header assembly. The header assembly can include a header portion having a first side and a second side, the header portion including one or more bores extending through the header portion from the first side to the second side. In certain example implementations, one or more platinum header pins are disposed within and extending through the one or more bores of the header portion. In certain example implementations, the header assembly can include one or more brazing portions corresponding to the one or more platinum header pins. In certain example implementations, the platinum header pins are configured for electrical communication with corresponding electrodes of a leadless transducer element.

19 Claims, 9 Drawing Sheets

HIGH-TEMPERATURE HEADERS FOR SENSING ELEMENTS

CROSS REFERENCE TO RELATED APPLICATIONS

This application is a continuation application of U.S. patent application Ser. No. 15/211,610, filed 15 Jul. 2016, the contents of which are incorporated by reference as if presented in full. This application also claims priority to U.S. Provisional Application No. 62/193,480, filed 16 Jul. 2015, and entitled "High-Temperature Headers with Ribbed Components for Stress-Relieved Hermetic Sealing," the contents of which are incorporated by reference as if presented in full.

TECHNICAL FIELD

This disclosure generally relates to pressure sensor headers for pressure sensors that operate in high-temperature environments.

BACKGROUND

Headers are typically used for electronic device packaging to provide stable and protective housing structures while providing electrical interconnections with associated pins for mounting and connecting to other devices. Certain operating conditions and environments can present a number of packaging challenges for reliable operation of the electronic devices. For example, pressure sensors that are utilized in aircraft engines, power generating turbines, or similar harsh and/or high-temperature environments are often subject to temperatures exceeding 400° C. In such devices and operating conditions, high-temperature headers and hermetic sealing can be utilized to increase the device reliability.

In general, headers for use with high-temperature pressure sensors can include mechanical housings and/or substrates with hermetic seals to accommodate various types of electrical interconnections and sensing elements. The need to maintain hermetic seals at elevated temperatures can present a number of challenges that require careful selection of materials, for example, to form a mechanically and electrically stable package.

Traditional headers utilize various metallurgical materials and plating that can have limitations at elevated temperatures. For example, traditional pin construction utilizes Kovar and/or Alloy 52 and nickel and/or gold plating. Such materials can limit the capability and reliability of the metal contacts formed between the sensing element and the metal pins in the header. Furthermore, the mechanical integrity of the header package is typically limited by the selection of material used to house the pins and to mount the sensing element. Typically available dielectric materials, such as Corning Pyrex, Corning 7052, Schott Borofloat, and similar borosilicate glasses, can undergo deformation at temperatures above 500° C., along with a degradation of their insulating properties.

In general, there is a need for increasing the reliability of the various interfaces between a pressure-sensing element, the measured environment, and the associated package for operation at increased temperatures.

BRIEF SUMMARY

Some or all of the above needs may be addressed by certain implementations of the disclosed technology. Certain implementations may include systems and methods for providing sensing assemblies with associated headers for use in high-temperature environments.

Certain example implementations include a header assembly. The header assembly can include a header portion having a first side and a second side, the header portion including one or more bores extending through the header portion from the first side to the second side. In certain example implementations, one or more platinum header pins are disposed within and extending through the one or more bores of the header portion. In certain example implementations, the header assembly can include one or more brazing portions corresponding to the one or more header pins, wherein the one or more brazing portions seal the one or more header pins to inner walls of the corresponding one or more bores. In certain example implementations, the platinum pins are configured for electrical communication with corresponding electrodes of a leadless transducer element.

In accordance with an example implementation of the disclosed technology, a transducer assembly is provided. The transducer assembly can include a leadless transducer element. The leadless transducer element includes one or more electrode portions and one or more interconnect regions in communication with the corresponding one or more electrode portions. The transducer assembly includes a header assembly in communication with the leadless transducer element. The header assembly can include a header portion having a first side and a second side. The header portion can include or more bores extending through the header portion from the first side to the second side. The header assembly includes one or more platinum header pins disposed within and extending through the one or more bores of the header portion. Certain example implementations include one or more brazing portions corresponding to the one or more header pins. The one or more brazing portions are configured to seal the one or more header pins to inner walls of the corresponding one or more bores. In accordance with an example implementation of the disclosed technology, the one or more interconnect regions and associated electrode portions are in electrical communication with the corresponding one or more header pins.

According to an example implementation of the disclosed technology, a method is provided. The method includes mounting a header assembly to a leadless transducer assembly; inserting one or more platinum header pins within and extending through one or more bores of a header portion of the header assembly; brazing the one or more platinum header pins to inner walls of the corresponding one or more bores; and joining the header assembly to the leadless transducer assembly such that one or more interconnect regions and associated electrodes of the leadless transducer assembly are in electrical communication with the corresponding one or more platinum header pins.

Other implementations, features, and aspects of the disclosed technology are described in detail herein and are considered a part of the claimed disclosed technology. Other implementations, features, and aspects can be understood with reference to the following detailed description, accompanying drawings, and claims.

LIST OF FIGURES

FIG. 1 depicts a cross-sectional side-view of a header sub-assembly 100, with an associated header portion 102 and header pins 104, according to an example implementation of the disclosed technology.

FIG. 2 is a 3-dimensional rendering of the header sub-assembly 100 that is shown in FIG. 1.

FIG. 3 depicts a cross-sectional side-view of a header sub-assembly 200 (similar to the header-subassembly 100 of FIG. 1) with an associated header shell 202 adjacent to the header portion 102.

DETAILED DESCRIPTION

Figure 1:
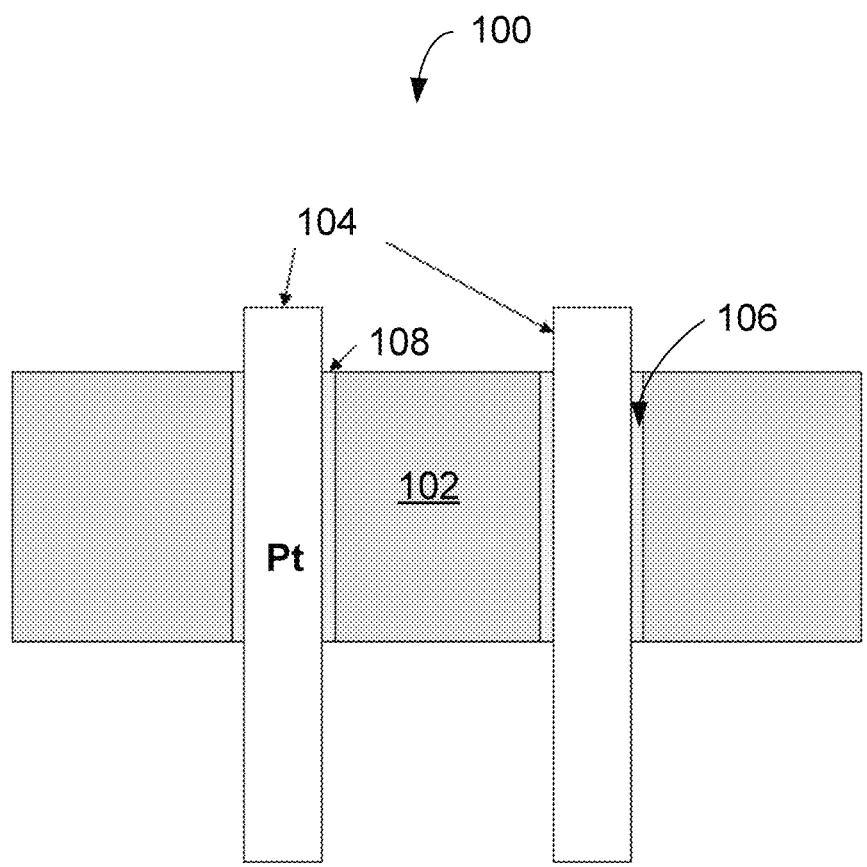

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description.

In accordance with certain example implementations of the disclosed technology, systems and methods are presented herein for improving electronic device packaging and reliability for high-temperature use. Certain example implementations may enable the use of pressure sensors in high-temperature environments. Certain example embodiments presented herein may provide an acceptable match of thermal expansion among the various components associated with pressure sensor devices and packaging. Certain example implementations provide a method for electrically connecting header pins to electrodes of an associated leadless transducer element.

As will be discussed in detail with respect to the accompanying figures, the disclosed technology provides a unique header configuration that utilizes platinum (Pt) pins with associated materials selected to provide sensors having thermally matched components. In accordance with certain example implementations of the disclosed technology, one or more ceramic materials such as aluminum nitride (AlN), gallium nitride (GaN), silicon nitride ($Si_3N_4$), silicon carbide (SiC), and/or other high temperature ceramic materials may be utilized with the platinum pins in the header packaging. In certain example implementations, high temperature glass-ceramic materials may be utilized with the platinum pins in the header packaging.

The present disclosure provides various examples, embodiments and the like, which may be described herein in terms of functional or logical block elements. Certain techniques described herein may be used for pressure sensor headers for use in pressure sensors that operate in high-temperature environments. The various aspects described herein are presented as methods, devices, and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. But, it is to be understood that embodiments of the disclosed technology may be practiced without these specific details. References to "one embodiment," "an embodiment," "example embodiment," "various embodiments," "implementation," and other like terms indicate that the embodiments or implementation of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure.

Figure 2:
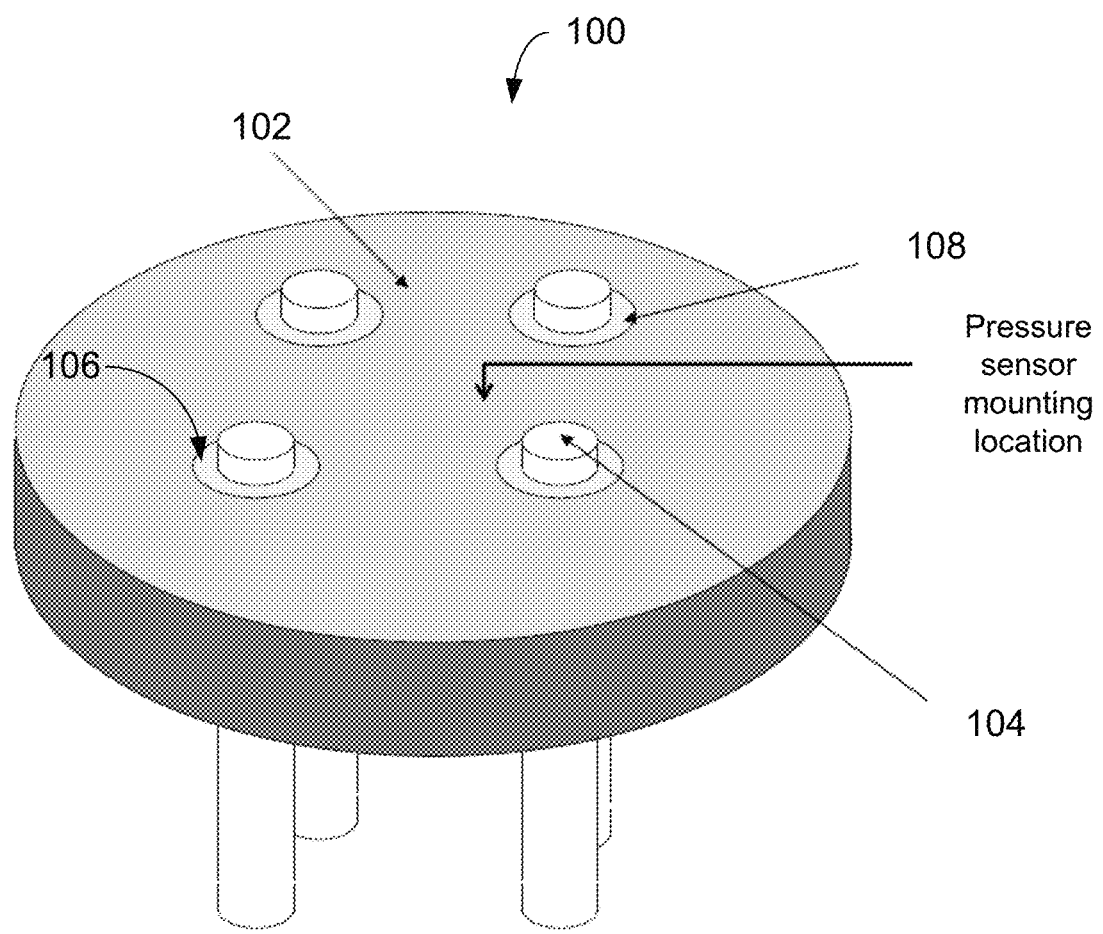

FIG. 1 depicts a cross-sectional side-view of a header sub-assembly 100, according to an example implementation of the disclosed technology. FIG. 2 is a 3-dimensional rendering of the header sub-assembly 100, as shown in FIG. 1, indicating a region where a pressure sensor may be mounted.

In an example implementation, the sub-assembly 100 can include a header portion 102 with one or more header pins 104 extending through bores 106 in the header portion 102. In accordance with certain example implementations, the header pins 104 may be brazed 108 to the header portion 102, for example, within the bores 106, thereby securing the pins 104 to the header portion 102 and creating a hermetic seal. In certain example implementations, the pins 104 may comprise platinum (Pt) material. In certain example implementations, the header portion 102 can include aluminum nitride (AlN). Certain example implementations the header portion 102 may utilize one or more of aluminum nitride (AlN), Gallium Nitride (GaN), Silicon Nitride (Si$_3$N$_4$), and/or Silicon Carbide (SiC).

In accordance with certain example implementations of the disclosed technology, the material used for the brazing 108 may include one or more of: tin, lead, gold, silver, copper, germanium, Kovar, Invar, molybdenum, brass, nickel, aluminum, titanium, tungsten, and/or alloys thereof.

In accordance with an example implementation of the disclosed technology, the location of the pins 104 and the placement of the associated bores 106 may be specifically configured for interfacing with additional components. Certain example implementations of the disclosed technology may enable making electrical connections from the pins 104 to corresponding connections associated with a high-temperature sensor element (for example, via a high temperature glass metal frit or metal powder) while simultaneously enabling the high temperature sensing element to be directly mounted to a specifically selected ceramic or glass ceramic supporting platform, as will be discussed below with reference to FIGS. 5-8. In certain implementations, a glass-metal frit or metal powder containing platinum may be utilized for making the electrical connections. In certain example implementations, the electrical connections may be made using one or more of the brazing materials discussed above. According to an example implementation of the disclosed technology, the use of platinum pins may provide certain benefits for matching expansion coefficients with the surrounding materials and/or the AlN header.

In accordance with an example implementation of the disclosed technology, the use of platinum material for the header pins 104 may eliminate a need for plating the header pins 104. In certain example implementations, the use of platinum material for the header pins 104 may enable a direct platinum contact of the pins 104 with other components via a platinum based glass frit or platinum powder, thus eliminating or reducing contact degradation associated with metal corrosion, diffusion, and other metallic interactions at high temperatures. In accordance with an example implementation of the disclosed technology, the use of platinum material for the header pins 104 combined with the platinum based glass frit or platinum powder may serve to create reliable electrical contacts with electrodes of a transducer element, for example, for use in high-temperature applications.

Figure 3:
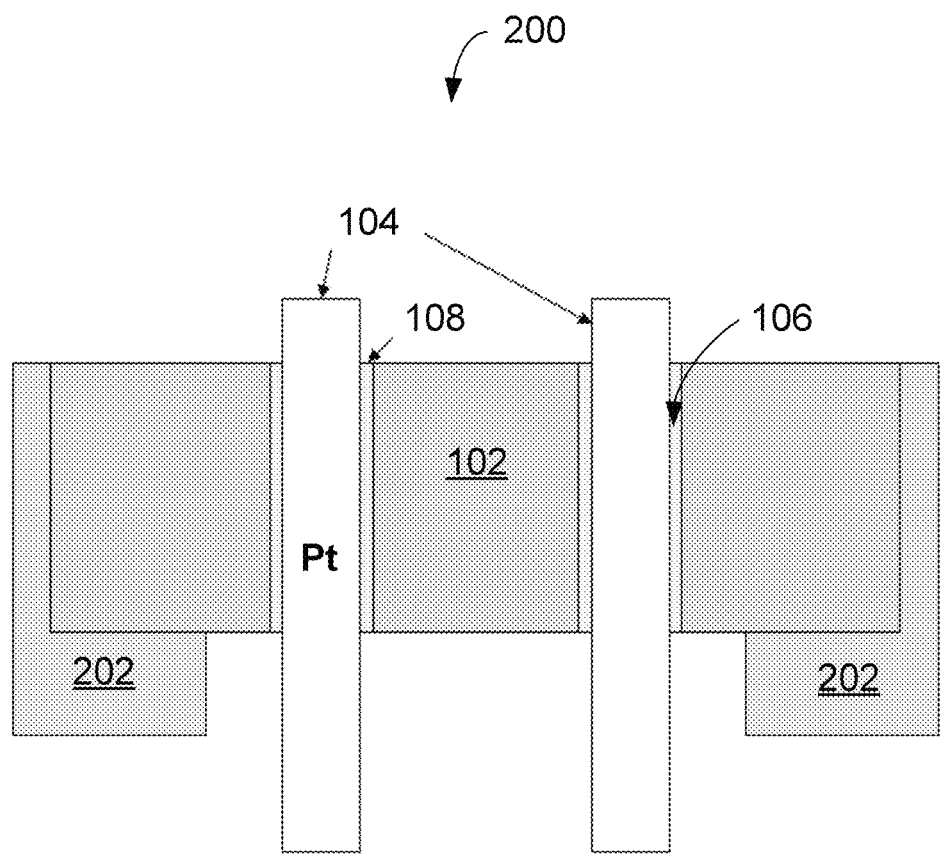
Figure 4:
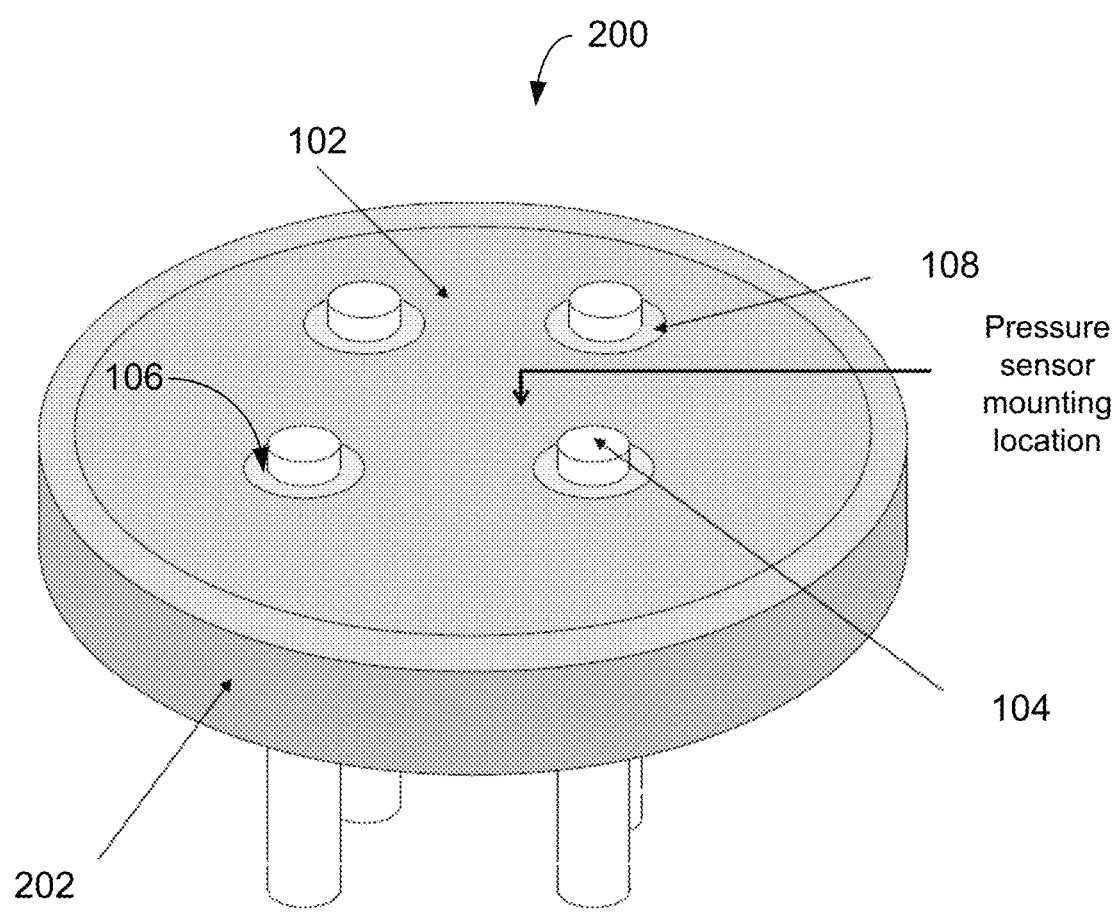
FIG. 4 is a 3-dimensional rendering of the header sub-assembly 200 that is shown in FIG. 3.

FIG. 3 depicts a cross-sectional side-view of a header sub-assembly 200 (similar to the header-subassembly 100 of FIG. 1) in accordance with an example implementation. FIG. 4 is a 3-dimensional rendering of the header sub-assembly 200, as shown in FIG. 3. The header sub-assembly 200 may include an associated header shell 202 adjacent to, or surrounding, the header portion 102. In certain example implementations, the header shell 202 may be hermetically sealed to the header portion 102 using one or more of brazing, thermally matched seals, compression seals, glass or glass frit sealing, or another appropriate sealing technique. In accordance with an example implementation of the disclosed technology, the header shell 202 may include material such as Inconel 718. In other example implementations, the header shell 202 can include one or more of glass, ceramic, aluminum nitride, or other suitable materials.

Figure 5:
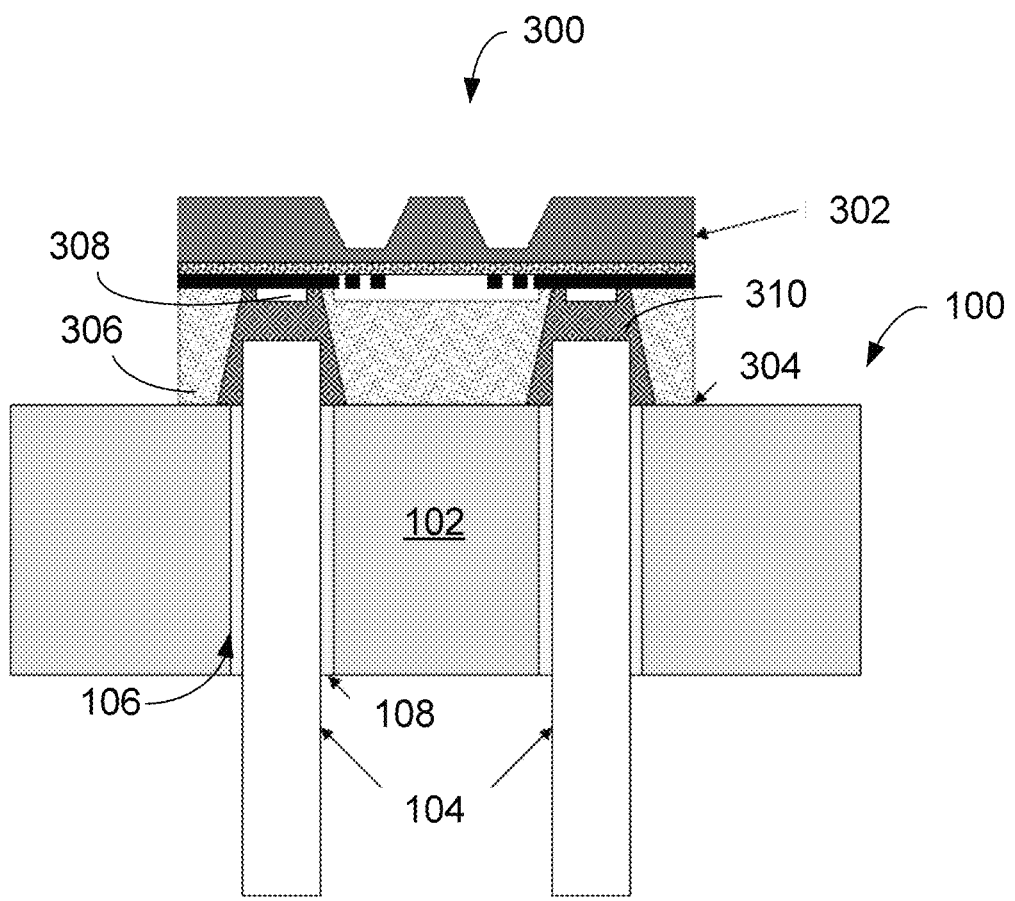
FIG. 5 depicts a cross-sectional side-view of a pressure sensor assembly 300, according to an example implementation of the disclosed technology, including the sub-assembly 100 as shown in FIG. 1.
Figure 6:
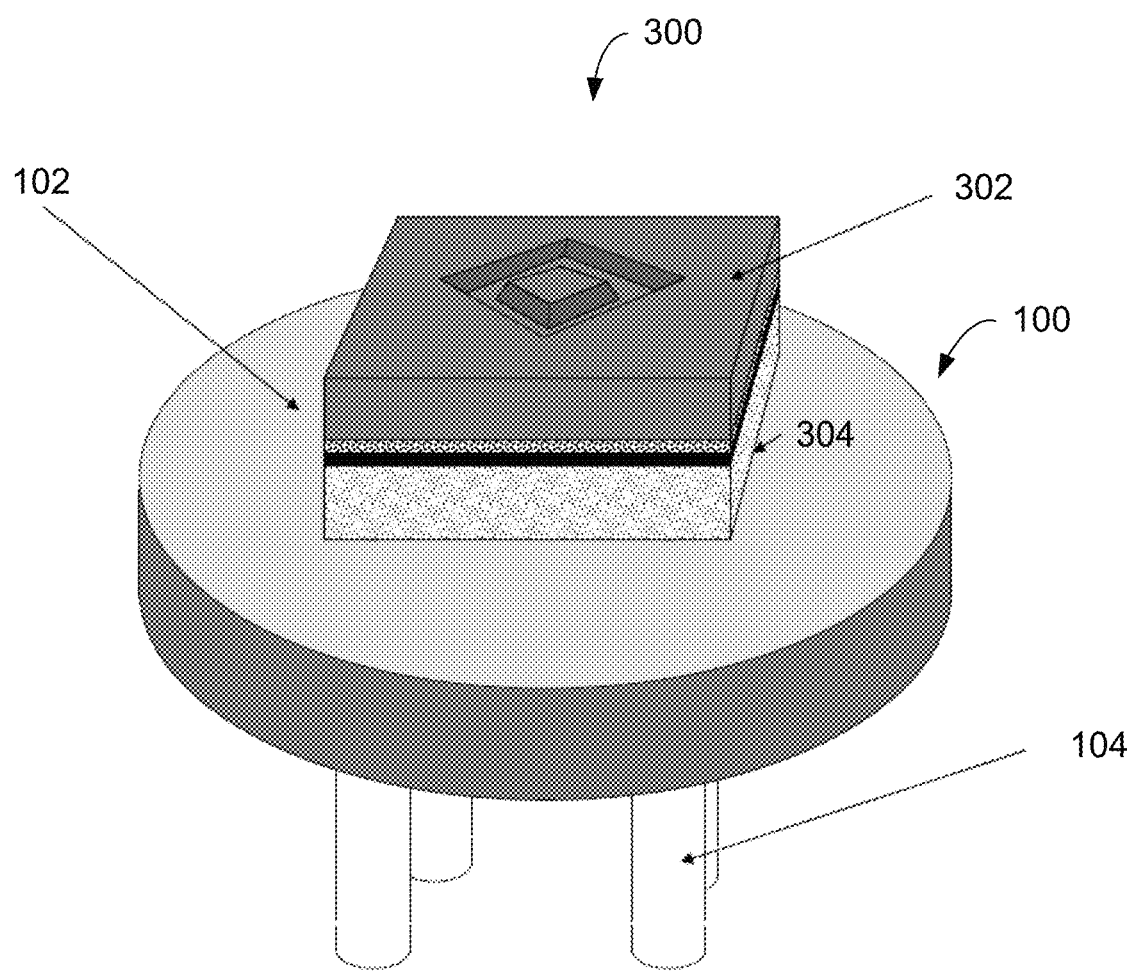
FIG. 6 is a 3-dimensional rendering of the header assembly 300, as shown in FIG. 5 including the sub-assembly 100 as shown in FIG. 1.

FIG. 5 depicts a cross-sectional side-view of a pressure sensor assembly 300, according to an example implementation of the disclosed technology, including the sub-assembly 100 as shown in FIG. 1. FIG. 6 is a 3-dimensional rendering of the header assembly 300, as shown in FIG. 5, including the sub-assembly 100 as shown in FIG. 1. As depicted in FIG. 5, the pressure sensor assembly 300 can include a transducer element 302 in physical and electrical communication with the sub-assembly 100. In accordance with an example implementation of the disclosed technology, a substrate 306 associated with the pressure sensor assembly 300 may be sealed 304 and connected with the sub-assembly 100 using one or more of brazing, thermally matched seals, compression seals, glass or glass frit sealing, or another appropriate sealing technique.

As briefly discussed above, and according to an example implementation of the disclosed technology, the use of platinum material for the header pins 104 may enable electrical contact of the pins 104 with corresponding electrode portions 308 of the pressure transducer element 302. For example, one or more interconnect regions 310 corresponding to electrode portions 308 in the pressure transducer element 302 may be defined and filled with a platinum-based glass frit or platinum powder (and baked) to electrically connect the header pins 104 with the electrode portions 308 of the transducer element 302. In certain example implementations, this method and configuration may be used to eliminate or reduce contact degradation associated with expansion, metal corrosion, diffusion, and other interactions at high temperatures. In accordance with an example implementation of the disclosed technology, the use of platinum material for the header pins 104 combined with the platinum based interconnect regions 310 may serve to create reliable electrical contacts, for example, for use in high-temperature applications.

Figure 7:
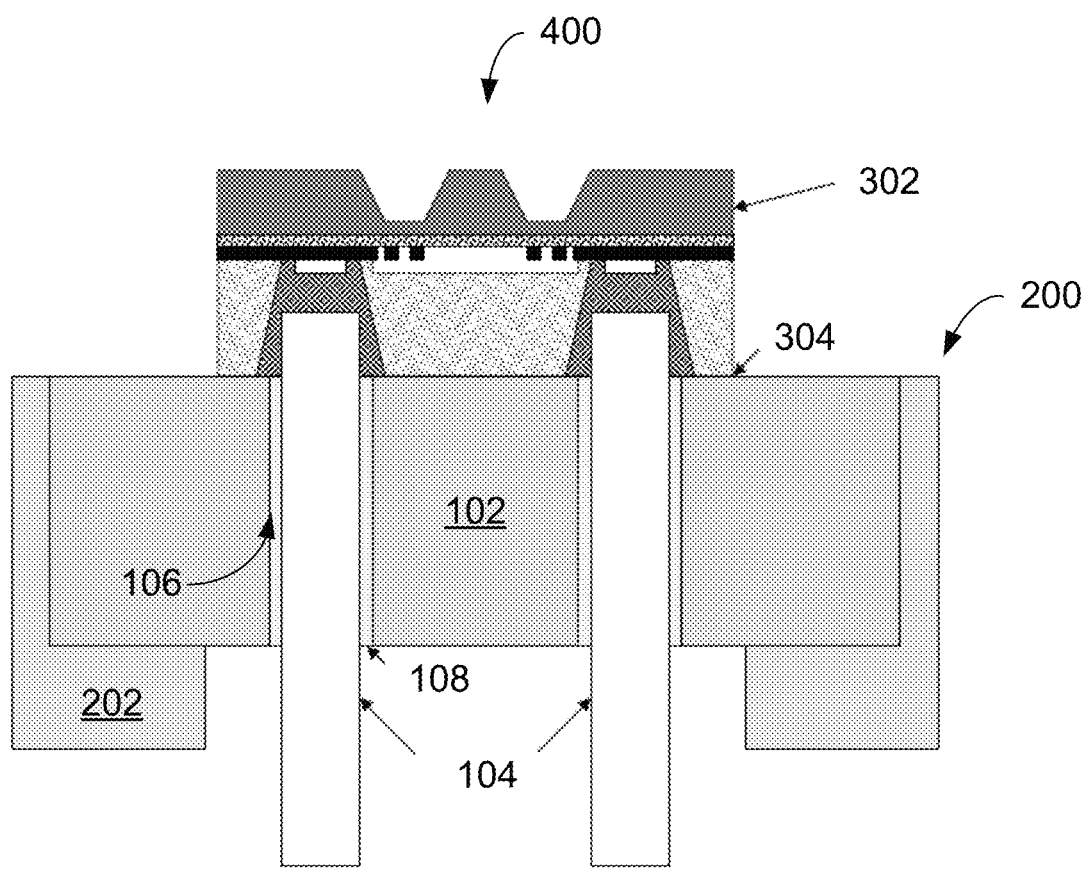
FIG. 7 depicts a cross-sectional side-view of a pressure sensor assembly 400 according to an example implementation of the disclosed technology, including the sub-assembly 200 as shown in FIG. 3.
Figure 8:
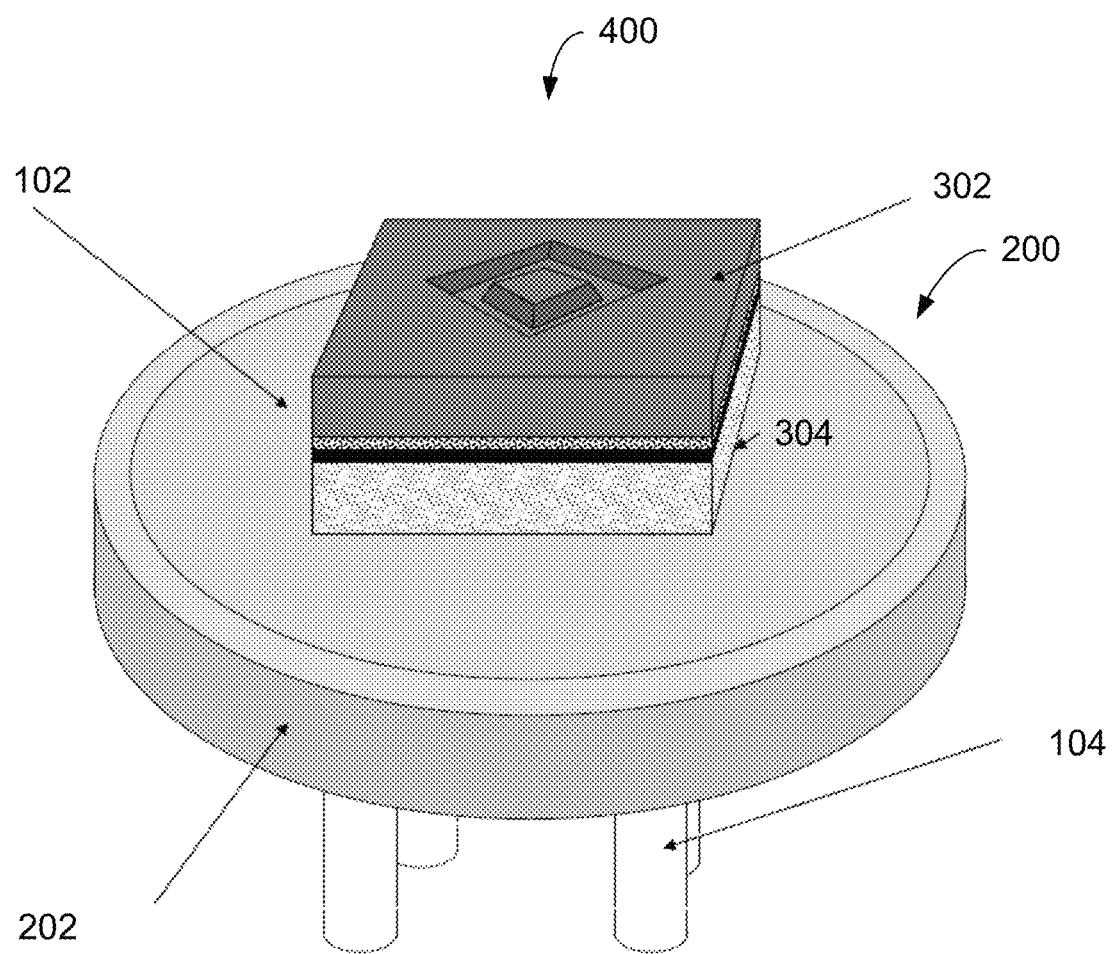
FIG. 8 is a 3-dimensional rendering of the header assembly 400, as shown in FIG. 7 including the sub-assembly 200 as shown in FIG. 3.

FIG. 7 depicts a cross-sectional side-view of a pressure sensor assembly 400 according to an example implementation of the disclosed technology, including the sub-assembly 200 as shown in FIG. 3. FIG. 8 is a 3-dimensional rendering of the header assembly 400, as shown in FIG. 7 including the sub-assembly 200 as shown in FIG. 3.

In accordance with an example implementation of the disclosed technology, aluminum nitride (AlN) may be used for the header portion 102 for thermally matching with the materials of the leadless composite sensor element 302. Certain example implementations may provide optimized performance at high temperature, for example, for use in environments having temperatures that may exceed 600° C. In other example implementations, the material used for the header portion 102 may be thermally matched to the materials used in the sensor element 302. For example, in certain example implementations, one or more of Gallium Nitride (GaN), Silicon Nitride (Si$_3$N$_4$), Silicon Carbide (SiC), or other high temperature ceramic materials, or high temperature glass-ceramic materials may be utilized for the header portion 102.

In some embodiments, the platinum pins 104 sealed within the header portion 102 may enable mounting and installation of the pressure sensing element 302 made from silicon, silicon carbide, or another suitable high-temperature semiconductor material.

In some embodiments, after mounting or sealing the pressure sensor element 302 to the header portion 102, the portions of the header pins 104 protruding from the header portion 102 (as depicted in FIGS. 1 and 2) can be completely encompassed within the pressure sensor element 302 (as depicted in FIG. 7), and thus can be sealed from the measurement environment. As will be appreciated, this sealing and mounting may be made possible by the close match between the thermal expansion characteristics of the pressure sensor element 302 and the header portion 102. As may be appreciated, the seal 304 between the sensor element 302 and the header portion 102 may provide complete isolation for the platinum pins from the measurement environment.

Figure 9:
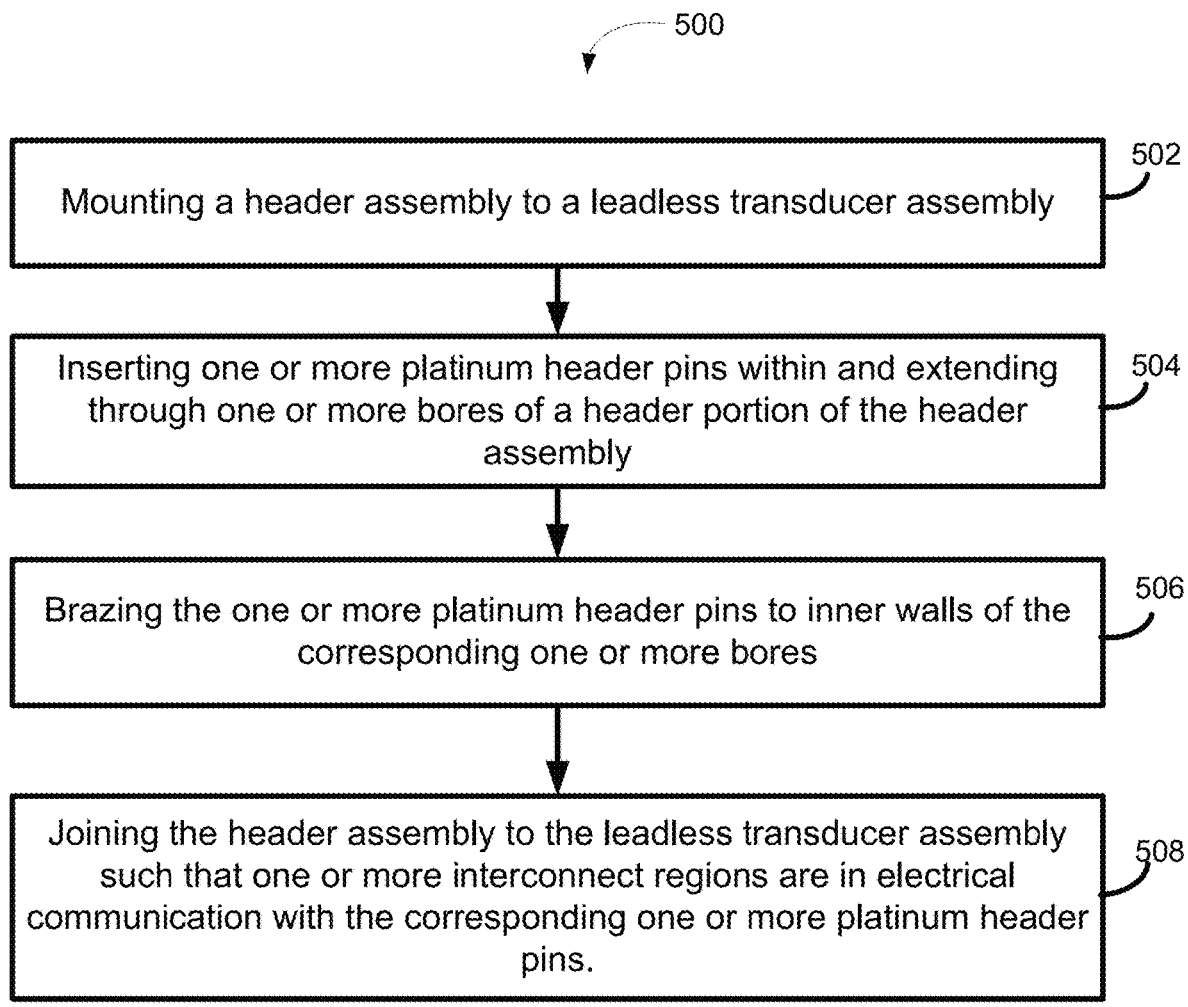
FIG. 9 is a flow diagram of a method 500, according to an example implementation of the disclosed technology.

FIG. 9 is a flow diagram of a method 500, according to an example implementation of the disclosed technology. In block 502, the method 500 includes mounting a header assembly to a leadless transducer assembly. In block 504, the method 500 includes inserting one or more platinum header pins within and extending through one or more bores of a header portion of the header assembly. In block 506, the method 500 includes brazing the one or more platinum header pins to inner walls of the corresponding one or more bores. In block 502, the method 500 includes joining the header assembly to the leadless transducer assembly, such that one or more interconnect regions are in electrical communication with the corresponding one or more platinum header pins.

In certain example implementations, the leadless transducer assembly can include a transducer element. The transducer element can include one or more electrode portions in which one or more interconnect regions are in communication with the corresponding one or more electrode portions. In certain example implementations, the header assembly can include a header portion having a first side and a second side, the header portion including one or more bores extending through the header portion from the first side to the second side.

In certain example implementations, the interconnect regions can include a platinum-based glass frit to electrically connect the one or more platinum header pins of the header assembly to the corresponding one or more electrode portions of the transducer element.

In certain example implementations, the header portion can include aluminum nitride (AlN). In certain example implementations, the header portion can include one or more of gallium nitride (GaN), silicon nitride ($Si_3N_4$), and silicon carbide (SiC).

According to an example implementation of the disclosed technology, the brazing forms a hermetic seal from the first side to the second side of the header portion.

In certain example implementations, joining the header assembly to the leadless transducer assembly can include one or more of: brazing, thermally matched sealing, compression sealing, and glass frit sealing.

In accordance with an example implementation of the disclosed technology, a transducer assembly is provided. The transducer assembly can include a leadless transducer element. The leadless transducer element includes one or more electrode portions; one or more interconnect regions in communication with the corresponding one or more electrode portions.

In certain example implementations, the transducer assembly includes a header assembly in communication with the leadless transducer element. The header assembly can include a header portion having a first side and a second side. The header portion can include one or more bores extending through the header portion from the first side to the second side. The header assembly includes one or more header pins disposed within and extending through the one or more bores of the header portion, the one or more header pins include a platinum material. Certain example implementations include one or more brazing portions corresponding to the one or more header pins. The one or more brazing portions are configured to seal the one or more header pins to inner walls of the corresponding one or more bores. In accordance with an example implementation of the disclosed technology, the one or more interconnect regions are in electrical communication with the corresponding one or more header pins.

According to an example implementation of the disclosed technology, the header pins may be completely made of platinum.

In certain example implementations, interconnect regions comprise a platinum-based glass frit to electrically connect the one or more header pins of the header assembly to the corresponding one or more electrode portions of the leadless transducer element.

According to an example implementation of the disclosed technology, the header portion includes aluminum nitride (AlN). In another example implementation the header portion comprises one or more of gallium nitride (GaN), silicon nitride ($Si_3N_4$), and silicon carbide (SiC).

In an example implementation, the brazing portions form a hermetic seal from the first side to the second side of the header portion.

Certain example implementations can include a header shell in contact and at least partially surrounding the header portion.

In accordance with an example implementation of the disclosed technology, the leadless transducer element is configured to measure a pressure.

In an example implementation, the leadless transducer element and the header assembly are hermetically sealed.

In certain example implementations, the leadless transducer assembly is configured to operate in environments having temperatures ranging from about 100° C. to about 700° C.

Certain example implementations include a header assembly. The header assembly can include a header portion having a first side and a second side, the header portion including one or more bores extending through the header portion from the first side to the second side. In certain example implementations, one or more header pins are disposed within and extending through the one or more bores of the header portion, the one or more header pins comprising a platinum material. In certain example implementations, the header assembly can include one or more brazing portions corresponding to the one or more header pins, wherein the one or more brazing portions seal the one or more header pins to inner walls of the corresponding one or more bores.

In certain example implementations, the header portion includes aluminum nitride (AlN). In certain example implementations, the header portion includes one or more of gallium nitride (GaN), silicon nitride ($Si_3N_4$), and silicon carbide (SiC).

According to an example implementation of the disclosed technology, the brazing portions form a hermetic seal from the first side to the second side of the header portion.

Certain example implementations may include a header shell in contact with, and at least partially surrounding, the header portion.

It is important to recognize that it is impractical to describe every conceivable combination of components or methodologies for purposes of describing the claimed subject matter. But a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, modifications and changes may be made without departing from the scope of the present disclosure as set forth in the claims below. For example, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

The invention claimed is:

1. A transducer assembly, comprising:
   a transducer element, comprising:
     one or more electrode portions; and
     one or more interconnect regions in communication with the corresponding one or more electrode portions;
   a header assembly in communication with the transducer element, the header assembly, comprising:
     a header portion having a first side and a second side, the header portion comprising one or more bores extending through the header portion from the first side to the second side;
     one or more platinum header pins disposed within and extending through the one or more bores of the header portion, the one or more platinum header pins protruding partially into the corresponding one or more interconnection regions; and
     one or more brazing portions corresponding to the one or more platinum header pins, wherein the one or more brazing portions seal the one or more platinum header pins to inner walls of the corresponding one or more bores;
   wherein the one or more interconnect regions are in electrical communication with the corresponding one or more platinum header pins.

2. The transducer assembly of claim 1, wherein the interconnect regions comprise a platinum-based glass frit to electrically connect the one or more platinum header pins of the header assembly to the corresponding one or more electrode portions of the transducer element.

3. The transducer assembly of claim 2, wherein the one or more interconnect regions are in electrical communication with the corresponding one or more platinum header pins, and wherein the one or more platinum header pins are not in direct contact with the corresponding one or more electrode portions.

4. The transducer assembly of claim 1, wherein the header portion comprises one or more of: aluminum nitride (AlN), gallium nitride (GaN), silicon nitride ($Si_3N_4$), and silicon carbide (SiC).

5. The transducer assembly of claim 1, wherein the brazing portions form a hermetic seal from the first side to the second side of the header portion.

6. The transducer assembly of claim 1, further comprising a header shell in contact and at least partially surrounding the header portion.

7. The transducer assembly of claim 1, wherein the transducer element is configured to measure a pressure.

8. The transducer assembly of claim 1, wherein the transducer element and the header assembly are hermetically sealed.

9. The transducer assembly of claim 1, wherein the transducer assembly is configured to operate in environments having temperatures ranging from about 100° C. to about 700° C.

10. A header assembly, comprising:
    a header portion having a first side and a second side, the header portion comprising one or more bores extending through the header portion from the first side to the second side;
    a substrate portion comprising one or more interconnect regions in communication with corresponding one or more electrode portions;
    one or more header pins disposed within and extending through the one or more bores of the header portion, the one or more header pins comprising a platinum material, the one or more header pins protruding partially into and in electrical communication with the corresponding one or more interconnection regions; and
    one or more brazing portions corresponding to the one or more header pins, wherein the one or more brazing portions seal the one or more header pins to inner walls of the corresponding one or more bores.

11. The header assembly of claim 10, wherein the interconnect regions comprise a platinum-based glass frit to electrically connect the one or more header pins of the header assembly to the corresponding one or more electrode portions.

12. The header assembly of claim 10, wherein the one or more electrode portions are configured for communication with a transducer element.

13. The header assembly of claim 12, wherein the transducer element is configured to measure a pressure.

14. The header assembly of claim 10, wherein the header portion comprises aluminum nitride (AlN).

15. The header assembly of claim 10, wherein the header portion comprises one or more of gallium nitride (GaN), silicon nitride ($Si_3N_4$), and silicon carbide (SiC).

16. The header assembly of claim 10, wherein the brazing portions form a hermetic seal from the first side to the second side of the header portion.

17. The header assembly of claim 10, further comprising a header shell in contact and at least partially surrounding the header portion.

18. The header assembly of claim 10, wherein the header pins are hermetically sealed to the header portion.

19. The header assembly of claim 10, wherein the header assembly is configured to operate in environments having temperatures ranging from about 100° C. to about 700° C.

* * * * *